United States Patent [19]

Yi et al.

[11] Patent Number: 5,777,832
[45] Date of Patent: Jul. 7, 1998

[54] DISK HAVING STRESS RELIEVING ZONES FOR USE WITH A DISK CLAMPING DEVICE IN A HARD DISK DRIVE

[75] Inventors: Seung-Young Yi; Woo-Cheol Jeong, both of Seoul, Rep. of Korea

[73] Assignee: SamSung Electronics Co., Ltd., Suwon, Rep. of Korea

[21] Appl. No.: 781,632

[22] Filed: Jan. 10, 1997

[30] Foreign Application Priority Data

Jan. 11, 1996 [KR] Rep. of Korea ............ 1996 441
Aug. 6, 1996 [KR] Rep. of Korea ............ 1996 32755

[51] Int. Cl.$^6$ ............................................. G11B 5/82
[52] U.S. Cl. .................................................. 360/135
[58] Field of Search .......................... 360/98.08, 99.12, 360/133, 135

[56] References Cited

U.S. PATENT DOCUMENTS

| | | | |
|---|---|---|---|
| 4,276,493 | 6/1981 | Srinivasa | 313/330 |
| 4,672,488 | 6/1987 | Wright | 360/135 |
| 4,785,444 | 11/1988 | Nakane | 360/135 |
| 5,315,463 | 5/1994 | Dew | 360/98.08 |
| 5,323,381 | 6/1994 | Takahashi et al. | |
| 5,447,768 | 9/1995 | Takahashi | |
| 5,476,700 | 12/1995 | Asai et al. | |
| 5,504,735 | 4/1996 | Ota et al. | |

FOREIGN PATENT DOCUMENTS 5-334665  12/1993  Japan.

*Primary Examiner*—A. J. Heinz
*Attorney, Agent, or Firm*—Robert E. Bushnell, Esq.

[57] ABSTRACT

A disk and a disk clamp device in a hard disk drive are disclosed. The disk of this invention has a stress and strain relief section, which effectively intercepts the spread of clamping torque-caused stress and strain energy from the clamped zone to the magnetic head landing zone of the disk when the disk is clamped to a spindle motor of the hard disk drive with a clamp being screwed to the hub of the spindle motor using a plurality of screws. The stress and strain relief section thus almost completely reduces strain in the landing zone and protects the landing zone from bending or distortion. The stress and strain relief section may be a plurality of concentric arcuate apertures which are regularly formed on a concentric circle at a position just outside a disk clamping portion of the clamp. Alternatively, the stress and strain relief section may be an annular groove which is concentrically formed on each side of the disk at a position between the clamped zone and the magnetic head landing zone.

25 Claims, 5 Drawing Sheets

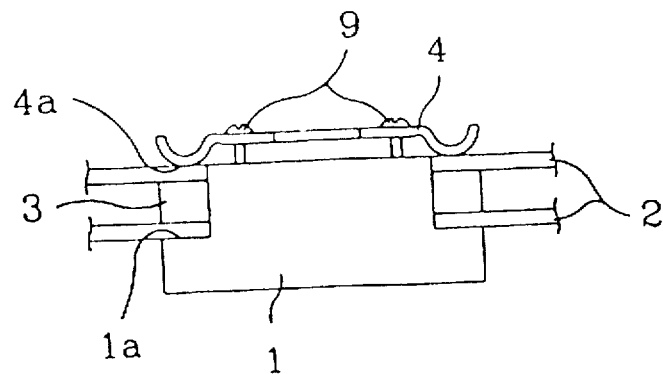
Fig. 1 CONVENTIONAL
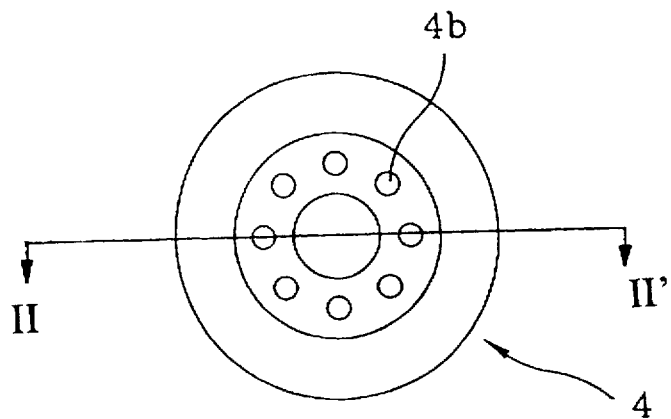
Fig. 2a CONVENTIONAL
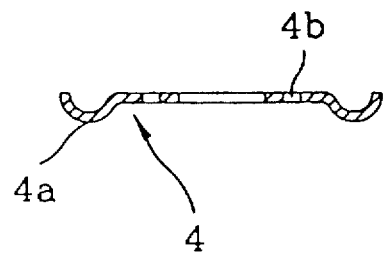
Fig. 2b CONVENTIONAL

DISK HAVING STRESS RELIEVING ZONES FOR USE WITH A DISK CLAMPING DEVICE IN A HARD DISK DRIVE

CLAIM OF PRIORITY

This application makes reference to, incorporates the same herein, and claims all benefits accruing under 35 U.S.C. §119 arising from an application for Disk And Disk Clamp Device For A Hard Disk Drive earlier filed in the Korean Industrial Property Office on 16 Nov., 1995 and there duly assigned Ser. No. 441/1996.

FIELD OF THE INVENTION

The present invention relates, in general, to a disk and a disk clamp device for a hard disk drive and, more particularly, to a structural improvement in such a disk and a disk clamp device for effectively intercepting the spread of a clamping torque-caused stress and strain energy from the clamped zone to the magnetic head landing zone of a disk when the disk is clamped to a spindle motor of the disk clamp device, thereby almost completely reducing strain in the landing zone and protecting the landing zone from bending or distortion caused by the stress and strain.

BACKGROUND OF THE INVENTION

There are several examples of disks that use grooves or corrugated patterns on the disk to improve the performance of the disk. For example, U.S. Pat. No. 5,323,381 for a Disc For Recording Information Signals to Takahashi et al. discloses an optical disk fastening means that contains grooves and protuberances in the optical disc. These grooves and protuberances are used to fasten the disc to the hub of the spindle. U.S. Pat. No. 5,476,700 for a Disc Base and Mold for Molding The Disc Base to Asai et al. discloses a disc base that contains an angular groove. U.S. Pat. No 5,504,735 for an Information Recording Disk Having A Stepped Central Recess And Hub Configuration to Ota shows steps and grooves formed on an interior part of the disc where the disc fastens to the hub. U.S. Pat. No. 5,447,768 for an Optical Disk With A Bearing Ring to Takahashi discloses an optical disc with a bearing ring. A ring or groove is formed in the hard disk to make an attachment to the hub of the disk drive. Finally, Japanese patent 405,334,665 uses corrugation to improve the magnetic recording characteristics of the disk. Therefore the use of corrugated regions near the axis can be used to improve performance in hard disks.

What is needed is the use of apertures and grooves in the hard disc to prevent the hard disk from warping and bending upon being fastened to the hub of a disk drive.

SUMMARY OF THE INVENTION

It is, thus, an object of the present invention to provide a disk and a disk clamp device for a hard disk drive in which the above problems can be overcome and which effectively intercept the spread of clamping torque-caused stress and strain energy from the clamped zone to the magnetic head landing zone of the disk when the disk is clamped to a spindle motor by a clamp, thus almost completely reducing strain in the landing zone and protecting the landing zone from bending or distortion.

It is another object of the present invention to change the structure of a disk for a hard disk drive and thereby to reduce deformation of the landing zone of the disk, caused by stress and strain generated in the disk when the disk is clamped to a spindle motor of the disk clamp device, thus effectively maintaining a constant moving height of a magnetic head and improving the operational performance and reliability of the hard disk drive while writing or reading data on or from the disk.

In order to accomplish the above object, the disk according to the present invention has a stress and strain relief section which intercepts the spread of clamping torque-caused stress and strain energy from the clamped zone to the magnetic head landing zone of the disk when the disk is clamped to a spindle motor of a disk clamp device, with a clamp being screwed to a hub of the spindle motor using a plurality of screws. In accordance with the first embodiment of this invention, the stress and strain relief section is made up of a plurality of arcuate apertures which are regularly formed on a concentric circle at a position just outside a disk clamping portion of the clamp. In accordance with a second embodiment of this invention, the stress and strain relief section is made up of an annular groove which is concentrically formed on each side of the disk at a position between the clamped zone and the magnetic head landing zone.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 1 is a sectional view showing typical disks clamped to the high speed spindle motor of a disk clamp device in a hard disk drive;

FIG. 2a is a top view showing the configuration and construction of a clamp included in the disk clamp device of FIG. 1;

FIG. 2b is a cross-sectional view of the clamp shown in FIG. 2a taken along sectional line II–II';

FIG. 5b is an enlargement of area "C" in FIG. 5a;

DETAILED DESCRIPTION OF THE INVENTION

Figure 3A:
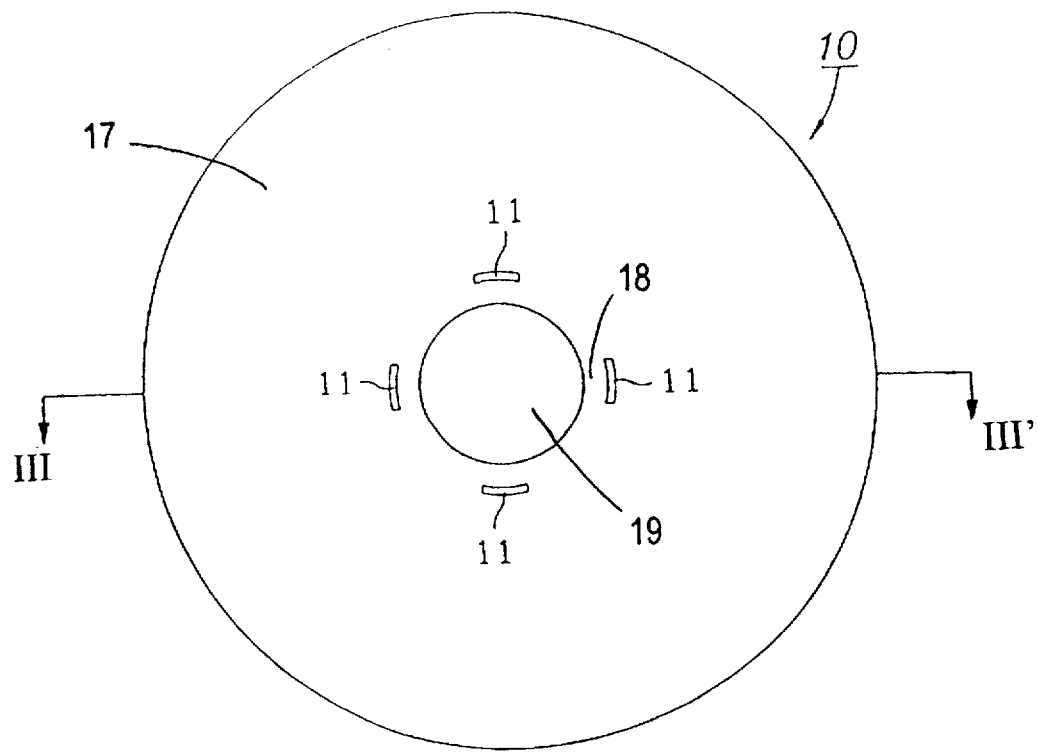
FIG. 3a is a top view showing the configuration and construction of a disk in accordance with the first embodiment of the present invention.
Figure 3B:
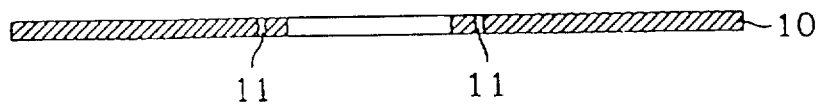
FIG. 3b is a cross-section of the disk shown in FIG. 3a taken along sectional line III–III'.

As well known to those skilled in the art, a hard disk is a magnetic media made of a rigid material, providing high-capacity random-access storage. Such a hard disk is driven by a hard disk drive, which is an auxiliary memory device of a computer and is used for writing or reading data on or from the disk using a magnetic head. The hard disk drive typically comprises a frame, which includes a base and cover, a spindle motor, which holds and rotates a disk, and a magnetic head or transducer which is used for writing or reading on or from the disk. The hard disk drive also includes a VCM-driven actuator which is operated by a voice coil motor (VCM) and controls the data writing and reading position of the magnetic head relative to the magnetic head landing zone of the disk. The above spindle motor and actuator of the hard disk drive are controlled by an electric circuit. The hard disk drive is connected to a computer by an interface.

For the above hard disk drive, the disk is clamped to the spindle motor of a disk clamp device and is rotated by the motor at a high speed. The high speed rotating motion of the disk generates an air circulation in the air above the top surface of the disk, thus raising and moving the magnetic head in the air above the disk with a micro-gap being formed between the head and disk. In the above state, the magnetic head is fixed to the tip of the VCM-driven actuator and is moved to a data searching position above the disk by the actuator prior to writing or reading data on or from the disk.

In the hard disk drive, the disk must be precisely and stably clamped to the spindle motor of the disk clamp device. FIG. 1 is a sectional view showing typical disks clamped to a high speed spindle motor of a disk clamp device. FIGS. 2a and 2b are views showing the construction of a clamp included in the disk clamp device of FIG. 1. As shown in FIG. 1, the top of a spindle motor 1 is externally stepped thus forming a hub and a disk holding part 1a. A plurality of screw holes are formed on the hub of the spindle motor 1. A plurality of, preferably, two disks 2 are fitted over the hub of the motor 1 and are seated on the disk holding part 1a, with an annular spacer 3 being interposed between the two disks 2 while spacing out the disks 2 and maintaining the flatness of the disks 2. An elastic clamp 4 is mounted to the top of the spindle motor's hub by a plurality of screws 9, thus tightly clamping the two disks 2 to the disk holding part 1a of the spindle motor 1. The above clamp 4, which has a circular configuration, has a center opening and is bent in a curve along the outside circular edge thereof, thus forming a disk clamping portion 4a having a semicircular cross-section as shown in the sectional view of FIG. 2b. A plurality of screw holes 4b are formed on the inside edge of the clamp 4. The above holes 4b can be aligned with the screw holes of the spindle motor's hub, respectively.

In order to clamp the disks 2 to the spindle motor 1, the spindle motor 1 is mounted to the base of a hard disk drive. Thereafter, the lower disk 2 is fitted over the hub of the motor 1 thus being seated on the disk holding part 1a. The annular spacer 3 is, thereafter, fitted over the hub of the motor 1 thus being seated on the lower disk 2. The upper disk 2 is fitted over the hub of the motor 1, so that the upper disk 2 is seated on the spacer 3. The two disks 2 are spaced apart from each other by the height of the spacer 3. Thereafter, the clamp 4 is fixed to the hub of the motor 1, so that the clamping portion 4a elastically biases the upper disk 2 downward thereby clamping both the disks 2 and the spacer 3 to the motor 1. In order to fix the clamp 4 to the motor 1, the clamp 4 is primarily arranged on the hub of the motor 1, with the screw holes 4b of the clamp 4 being aligned with the screw holes of the motor 1 respectively. Thereafter, four screws 9 are screwed into the aligned screw holes through a symmetric screwing method, thus finishing the disk clamping process.

However, the above disk and the disk clamp device in a hard disk drive are problematic in that the disks, seated on the disk holding part of the spindle motor, are partially biased by the elastic clamping portion of the clamp which is screwed to the hub of the spindle motor. The partially-biased zone or clamped zone of each disk is concentrically stressed. The stress of the clamped zone in turn is spread to the magnetic head landing zone (data writing and reading zone) of the disk, thereby bending or distorting the landing zone. Such bending or distortion of the landing zone of each disk causes unstable moving condition of the magnetic head, thus resulting in an error while the magnetic head writes or reads data to or from the disk and also while bringing the head into contact with the disk.

The clamped zone of the disk, which is clamped to the spindle motor, may fail to maintain its flatness due to both the surface roughness of the aluminum surface of the disk and the partial stress caused by the clamping torque. Therefore, it is difficult to maintain a constant moving height of the magnetic head, so that the output signals of the head may vary and thereby cause an error while writing or reading data on or from the disk.

Figure 6A:
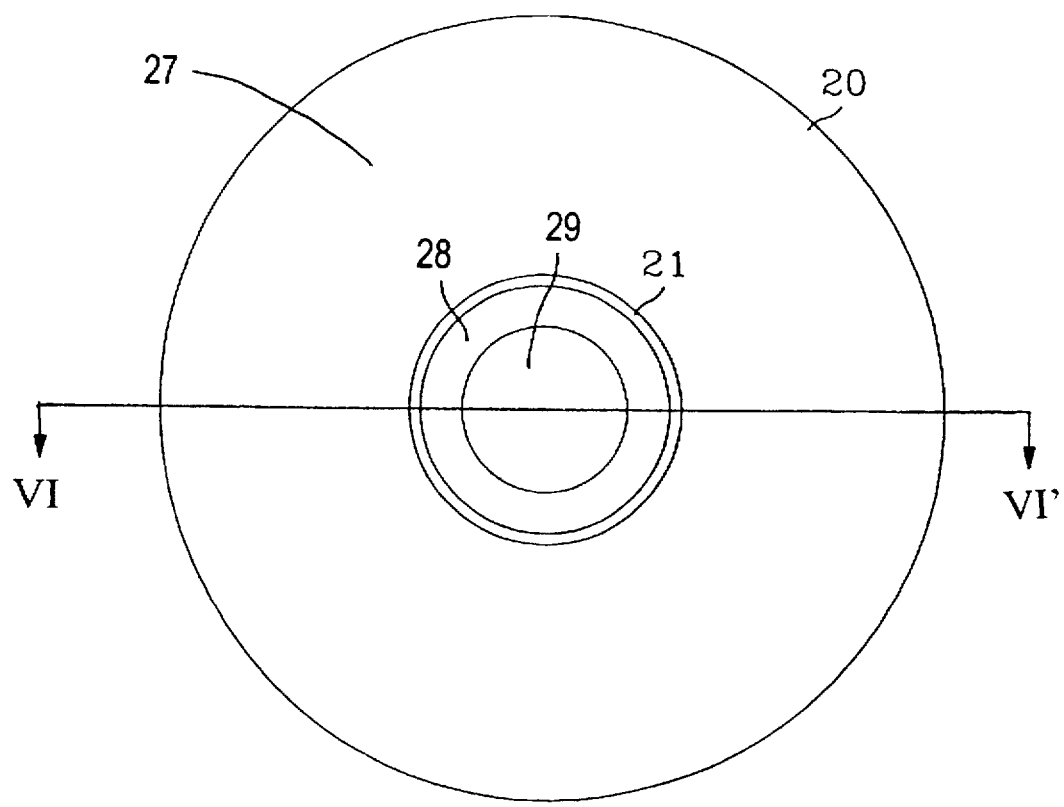
FIG. 6a is a view showing the configuration and construction of a disk in accordance with the second embodiment of the present invention.
Figure 6B:
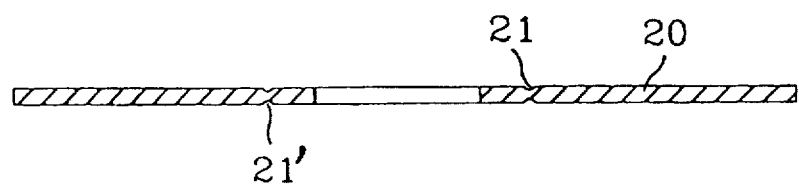
FIG. 6b is a cross-section of the disk shown in FIG. 6a taken along sectional line VI–VI'.
Figure 7:
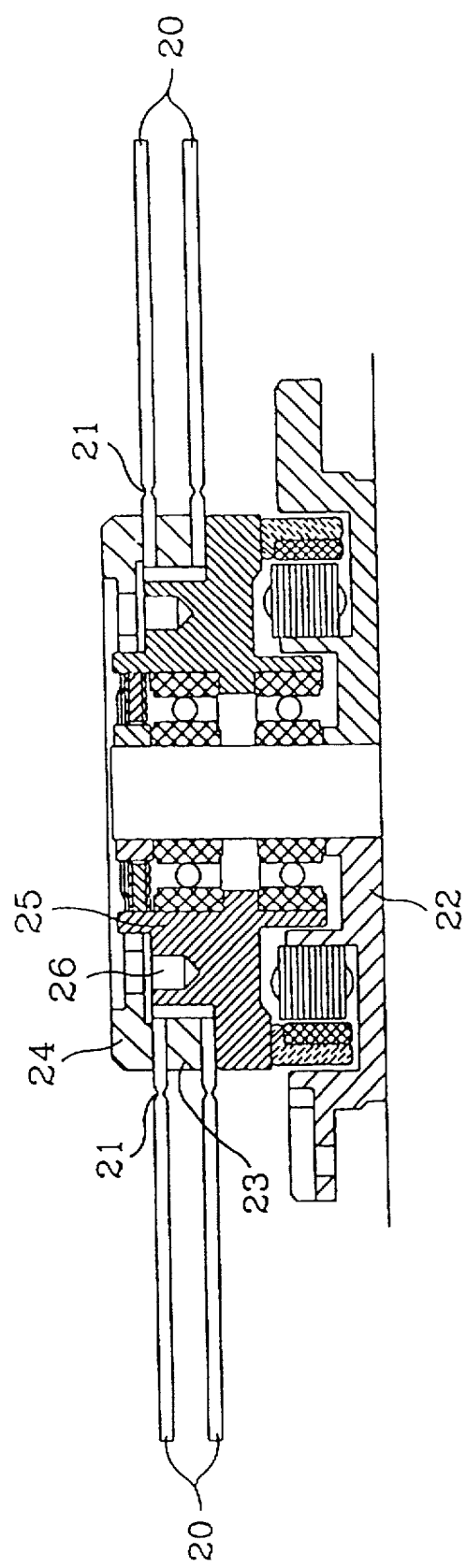
FIG. 7 is a sectional view showing the disks of FIGS. 6a and 6b which are clamped to the high speed spindle motor of a disk clamp device in a hard disk drive.

FIGS. 3a, 3b, 4, 5a, and 5b show a disk 10 and a disk clamp device 14 for a hard disk drive in accordance with the first embodiment of this invention. FIGS. 6a, 6b, and FIG. 7 show a disk 20 and a disk clamp device 24 for a hard disk drive in accordance with the second embodiment of the present invention. The disk 10 according to this invention has a center opening and a stress and strain relief section which is used for intercepting the spread of stress and strain energy from the clamped zone to the landing zone in the disk 10 when the disk 10 is clamped to a spindle motor 12 by a circular clamp 14. In the first embodiment of this invention, the stress and strain relief section comprises a plurality of arcuate apertures 11. Four arcuate apertures 11 are shown in the embodiment shown in FIGS. 3a, 3b, and 4. The arcuate apertures 11 are formed on the edge of the center opening of the disk 10 in such a manner that the arcuate apertures 11 are arranged on a concentric circle around the center opening with regular intervals being formed between the arcuate apertures 11. The concentric circle formed by the arcuate apertures 11 is preferably positioned just outside the disk clamping portion of the clamp 14, so that the arcuate apertures 11 effectively intercept the spread of clamping torque-caused stress from the clamped zone to the magnetic head landing zone of the disk 10 when the disk 10 is clamped to the spindle motor 12.

Figure 4:
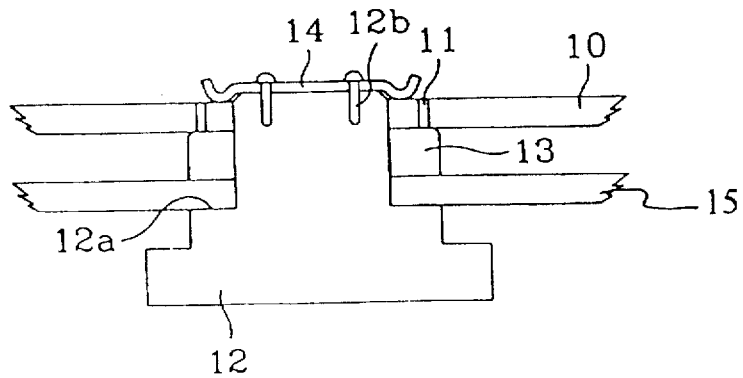
FIG. 4 is a sectional view showing the disks of FIGS. 3a and 3b which are clamped to the high speed spindle motor of a disk clamp device in a hard disk drive.
Figure 5A:
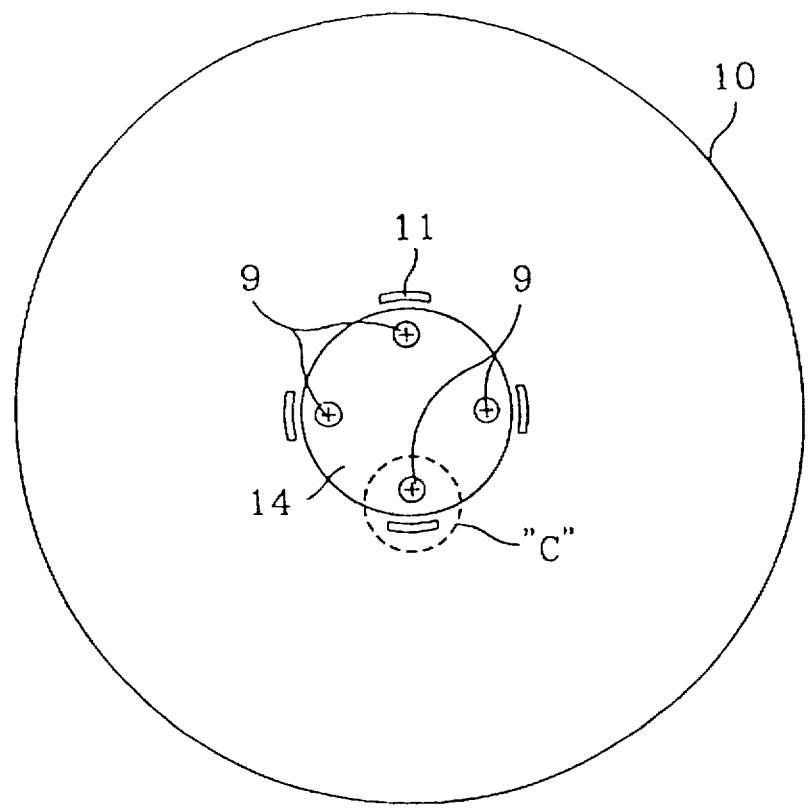
FIG. 5a is a plan view showing the upper disk clamped to the spindle motor of the disk clamp device of this invention.
Figure 5B:
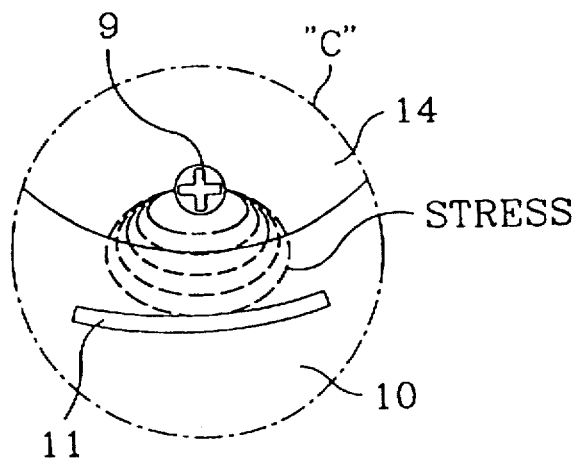

As shown in FIG. 4, the top of a spindle motor 12 is externally stepped thus forming a hub and a disk holding part 12a. A plurality of screw holes 12b are formed on the hub of the spindle motor 12. A plurality of, preferably, two disks 10 and 15 are fitted over the hub of the motor 12 and are seated on the disk holding part 12a, with an annular spacer 13 being interposed between the two disks 10 in order to space out the disks 10 and 15 and maintain the flatness of the disks 10 and 15. An elastic clamp 14 is mounted to the top of the spindle motor's hub by a plurality of, preferably, four screws 9, thus tightly clamping the two disks 10 and 15 to the spindle motor 12. The above clamp 14, which has a circular configuration, is provided with a center opening and is bent in a curve along the circular outside edge thereof, thus forming a disk clamping portion having a semicircular cross-section. A plurality of screw holes are formed on the clamp 14. The screw holes of the clamp 14 can be aligned with the screw holes 12b of the spindle motor's hub, respectively.

In order to clamp the above disks 10 and 15 to the spindle motor 12, the spindle motor 12 is mounted to the base of a hard disk drive. Thereafter, the lower disk 15 is fitted over the hub of the motor 12 thus being seated on the disk holding part 12a of the motor 12 as shown in FIG. 4. The annular spacer 13 is fitted over the hub of the motor 12 in order to be seated on the lower disk 15. The upper disk 10 is fitted over the hub of the motor 12, so that the upper disk 10 is seated on the spacer 13, with a gap being formed between the two disks 10 and 15 caused by the height of the spacer 13. Thereafter, the clamp 14 is fixed to the hub of the motor 12, so that the clamping portion of the clamp 14 elastically biases the upper disk 10 downward thereby clamping both the disks 10 and the spacer 13 to the motor 12. In order to fix the clamp 14 to the motor 12, the clamp 14 is primarily arranged on the hub of the motor 12, with the screw holes of the clamp 14 being aligned with the screw holes 12b of the motor 12. Thereafter, four screws 9 are screwed into the aligned screw holes through a symmetric screwing method, thus finishing the disk clamping process. In the above state, the clamping force of the clamp 14 generates stress in the clamped zone of the upper disk 10. The stress of the clamped zone may be spread to the landing zone of the upper disk 10, thus causing a strain in the landing zone of the upper disk 10. However, the arcuate apertures 11 of this invention intercept the spread of stress from the clamped zone to the landing zone of upper disk 10, thereby reducing the area of stress distribution. The arcuate apertures 11 also minutely move in response to the bending or distortion caused by the clamping torque, thus effectively protecting the landing zone of upper disk 10 from bending or distortion.

FIG. 4 shows one embodiment of the present invention where upper disk 10 contains arcuate apertures 11 while lower disk 15 does not. In an alternative embodiment not shown, arcuate apertures 11 may be formed in lower disk 15 in addition to being formed in upper disk 10. In this alternative embodiment, lower disk 15 would be identical in design to upper disk 10.

As described above, the disk according to the primary embodiment of the present invention almost completely prevents bending or distortion of the landing zone of the disk caused by the clamping force when the disk is clamped to the spindle motor by screwing the clamp to the spindle motor. Therefore, the above disk effectively maintains a constant moving height of the magnetic head and improves the operational performance and reliability of the hard disk drive while writing or reading data on or from the disk.

FIGS. 6a, 6b, and 7 show a disk and a disk clamp device for a hard disk drive in accordance with a second embodiment of the present invention. In the second embodiment, the stress and strain relief section comprises an annular groove 21 which is concentrically formed on each side of the disk 20 at a position between the clamped zone and the magnetic head landing zone as shown in FIGS. 6a, 6b, and 7. It is preferable to form the annular groove 21 at a position just outside the disk clamping portion of the clamp 24.

The annular groove 21, which is concentrically formed on each side of the disk 20, may have a semicircular cross-section. Alternatively, the annular groove 21 may have a V-shaped cross-section.

As shown in FIG. 7, the top of a spindle motor 22 is externally stepped, thus forming a hub 25 and a disk holding part. A plurality of screw holes 26 are formed on the hub 25 of the spindle motor 22. A plurality of, preferably, two disks 20 with the grooves 21 are fitted over the hub 25 of the motor 22 and are seated on the disk holding part, with an annular spacer 23 being interposed between the two disks 20 in order to space out the disks 20 and maintain the flatness of the disks 20. An elastic clamp 24 is mounted to the top of the spindle motor's hub 25 by a plurality of screws, thus tightly clamping the two disks 20 to the spindle motor 22.

In order to clamp the above disks 20 to the spindle motor 22, the spindle motor 22 is mounted to the base of a hard disk drive. Thereafter, the lower disk 20 with the grooves 21 is fitted over the hub 25 of the motor 22, thus being seated on the disk holding part of the motor as shown in FIG. 7. The annular spacer 23 is fitted over the hub 25 of the motor 22 in order to be seated on the lower disk 20. The upper disk 20 is fitted over the hub 25 of the motor 22, so that the upper disk 20 is seated on the spacer 23, with a gap being formed between the two disks 20 caused by the height of the spacer 23. Thereafter, the clamp 24, which is formed of an aluminum plate through a cutting process, is fixed to the hub 25 of the motor 22 by screwing the clamp 24 to the hub 25 of the motor 22 through a symmetric screwing method, thus finishing the disk clamping process. The clamping portion of the clamp 14 in the above state biases the upper disk 20 downward, thereby clamping both the disks 20 and the spacer 23 to the motor 22.

In the above state, the grooves 21 of each disk 20 intercept the spread of stress from the clamped zone to the landing zone of the disk 10 thereby reducing the area of stress distribution. The grooves 21 also minutely move in response to bending or distortion caused by the clamping torque, thus effectively protecting the landing zone of each disk 20 from bending or distortion.

As described above, the present invention provides a structurally-improved disk and a disk clamp device for a hard disk drive. The disk of this invention is provided with a stress and strain relief section for effectively intercepting the spread of clamping torque-caused stress and strain energy from the clamped zone to the landing zone of the disk when the disk is clamped to a spindle motor of a disk clamp device. In accordance with the first embodiment of this invention, the stress and strain relief section comprises a plurality of arcuate grooves which are formed on the edge of the center opening of the disk in such a manner that the grooves are arranged on a concentric circle around the center opening, with regular intervals being formed between the grooves. In accordance with the second embodiment of this invention, the stress and strain relief section comprises an annular groove which is concentrically formed on each side of the disk at a position between the clamped zone and the landing zone. The stress and strain energy are thus preferably concentrated to the stress and strain relief section, so that the stress and strain relief section effectively reduces the strain in the landing zone and thereby improves the flatness of the disk. Therefore, the above disk effectively maintains a constant moving height of the magnetic head and improves the operational performance and reliability of the hard disk drive while writing or reading data on or from the disk.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A disk for a hard disk drive, said disk being clamped to a shaft of the hard disk drive having a hollow center and an outer periphery, said disk comprising:

an annular clamped zone centered and located adjacent to the center of a circular disk surrounded by an annular memory containing representations of digital information;

a stress and strain relieving zone positioned on said disk in an annular ring adjacent to said clamped zone; and a magnetic head landing zone positioned between said outer periphery of said disk and said stress and strain relieving zone, said stress and strain relieving zone attenuating the transmission of deformation, warpage, stress and strain from said clamped zone to said magnetic head landing zone when said disk is clamped to the shaft of said hard disk drive.

2. The disk of claim 1, said stress and strain relieving zone being comprised of a plurality of arcuate apertures disposed concentrically and symmetrically about said center of said disk.

3. The disk of claim 1, said stress and strain relieving zone being comprised of a concentric groove disposed on one surface of said disk.

4. The disk of claim 3, said concentric groove having a V-shaped cross section.

5. The disk of claim 3, said concentric groove having a semi circular cross section.

6. The disk of claim 1, said stress and strain relieving zone being comprised of concentric grooves placed on both surfaces of said disk.

7. The disk of claim 6, said concentric grooves having a V-shaped cross section.

8. The disk of claim 6, said concentric grooves having a semi circular cross section.

9. A disk being clamped to a shaft, said disk having a hollow center and an outer periphery, said disk comprising:

an annular clamped zone centered and located adjacent to a hollow center of a circular disk surrounded by an annular memory containing representations of digital information;

a stress and strain relieving zone positioned on said disk in an annular ring adjacent to said clamped zone and spaced radially apart from said hollow center; and said annular memory being positioned between said outer periphery of said disk and said stress and strain relieving zone, said stress and strain relieving zone attenuating the transmission of deformation, warpage, stress and strain from said clamped zone to said annular memory when said disk is clamped to the shaft.

10. The disk of claim 9, said stress and strain relieving zone being comprised of a plurality of arcuate apertures disposed concentrically and symmetrically about said center of said disk.

11. The disk of claim 9, said stress and strain relieving zone being comprised of a concentric groove disposed on one surface of said disk.

12. The disk of claim 11, said concentric groove having a V-shaped cross section.

13. The disk of claim 11, said concentric groove having a semi circular cross section.

14. The disk of claim 9, said stress and strain relieving zone being comprised of concentric grooves placed on both surfaces of said disk.

15. The disk of claim 14, said concentric grooves having a V-shaped cross section.

16. The disk of claim 14, said concentric grooves having a semi circular cross section.

17. A hard disk drive assembly, comprising:

a plurality of screws;

a clamp;

a spindle motor; and a disk, comprising:

a magnetic head landing zone defining an annular memory containing representations of digital information, a clamped zone, and a stress and strain reliever, said stress and strain reliever intercepting the spread of clamping torque caused stress and strain energy created when said disk is clamped to said spindle motor using said clamp and said plurality of screws.

18. The disk according to claim 17, said stress and strain reliever comprises a plurality of grooves regularly formed on a concentric circle around the clamped zone.

19. The disk according to claim 18, wherein the concentric circle formed by said grooves is positioned just outside said clamped zone.

20. The disk according to claim 17, said stress and strain reliever comprises a plurality of arcuate apertures arranged on a concentric circle formed around said clamped zone.

21. The disk according to claim 20, wherein the concentric circle formed by said arcuate apertures are positioned between said clamped zone.

22. A hard disk drive assembly, comprising:

a spindle motor having a hub;

a clamp;

a plurality of screws; and a hard disk comprising:

a first surface and a second surface, a clamped zone, a magnetic head landing zone, and an annular groove concentrically formed on said first surface of said disk at a location between said clamped zone and said magnetic head landing zone, said annular groove preventing the spread of clamping torque-caused stress and strain energy from said clamped zone to said magnetic head landing zone when said disk is clamped to said spindle motor by said clamp being screwed to said hub of said spindle motor using said plurality of screws.

23. The disk according to claim 22, an additional annular groove is concentrically formed on said second surface of said disk at a location corresponding to said annular groove formed on said first surface of the disk.

24. The disk according to claim 23, each of said annular grooves has a semicircular cross-section.

25. The disk according to claim 23, each of said annular grooves has a V-shaped cross-section.

* * * * *